United States Patent [19]

Seitz et al.

[11] Patent Number: 5,120,788
[45] Date of Patent: Jun. 9, 1992

[54] HERMOPLASTIC MOLDING MATERIAL OF IMPROVED TOUGHNESS

[75] Inventors: Friedrich Seitz, Friedelsheim; Karl Ruppmich, Ludwigshafen, both of Fed. Rep. of Germany

[73] Assignee: BASF Aktiengesellschaft, Ludwigshafen, Fed. Rep. of Germany

[21] Appl. No.: 657,866

[22] Filed: Feb. 20, 1991

[30] Foreign Application Priority Data

Feb. 20, 1990 [DE] Fed. Rep. of Germany ....... 4005210

[51] Int. Cl.$^5$ .................... C08F 265/06; C08F 218/10
[52] U.S. Cl. ......................... 525/85; 525/80; 525/83; 525/84; 525/238; 525/241
[58] Field of Search ........................ 525/85, 83, 84, 80, 525/238, 241

[56] References Cited

U.S. PATENT DOCUMENTS

| 3,055,859 | 9/1962 | Vollmert | 260/45.5 |
|---|---|---|---|
| 3,691,260 | 9/1972 | Mittnacht et al. | 260/876 R |
| 4,224,419 | 9/1980 | Swoboda et al. | 525/71 |
| 4,308,355 | 12/1981 | Tokas | 525/84 |
| 4,351,923 | 9/1982 | Tokas | 525/250 |
| 4,433,102 | 2/1984 | Brandstetter et al. | 525/85 |
| 4,442,263 | 4/1984 | Brandstetter et al. | 525/85 |
| 4,634,734 | 1/1987 | Hambrecht et al. | 525/85 |
| 4,748,205 | 5/1988 | Katto et al. | 525/85 |
| 4,788,253 | 11/1988 | Hambrecht et al. | 525/85 |

FOREIGN PATENT DOCUMENTS 0270948 6/1988 European Pat. Off.
1124911 8/1968 United Kingdom.

*Primary Examiner*—John C. Bleutge
*Assistant Examiner*—W. R. H. Clark
*Attorney, Agent, or Firm*—Oblon, Spivak, McClelland, Maier & Neustadt

[57] ABSTRACT

A thermoplastic molding material containing (based on the sum of A+B+C)

A: from 1 to 30% by weight of one or more elastomeric polymers A having a mean particles size of from 30 to 1000 nm and comprising, based on A,
- A1: from 50 to 99.9% by weight of one or more alkyl acrylates A1 having from 1 to 8 carbon atoms in the alkyl radical,
- A2: from 0.1 to 5% by weight of one or more polyfunctional, crosslinking monomers A2 and
- A3: up to 50% by weight of one or more monoethylenically unsaturated monomers A3, as the graft base, B: from 5 to 40% by weight of shells B grafted onto the elastomeric polymer A and comprising, based on B,
- B1: from 30 to 90% by weight of one or more vinylaromatic monomers B1,
- B2: from 5 to 40% by weight of one or more polar, copolymerizable, ethylenically unsaturated monomers B2, and
- B3: from 5 to 30% by weight of one or more alkyl acrylates B3 having from 7 to 20 carbon atoms in the alkyl radical, and C: from 30 to 94% by weight of a copolymer C comprising C1: one or more vinyl-aromatic monomers C1 and
- C2: one or more polar, copolymerizable, ethylenically unsaturated monomers C2.

2 Claims, No Drawings

THERMOPLASTIC MOLDING MATERIAL OF IMPROVED TOUGHNESS

The present invention relates to a thermoplastic acrylate/styrene/acrylonitrile (ASA) molding material of high toughness.

The preparation of weathering- and aging-resistant ASA polymers is described, inter alia, in U.S. Pat. No. 3,055,859 and GB 1,124,911 (DE 12 60 135), where the rubber-elastic polymer serving as the graft base is first prepared by emulsion polymerization of acrylates having from 4 to 8 carbon atoms. The resultant latex generally has a mean particle diameter of less than 100 nm; a mixture of styrene and acrylonitrile is grafted onto this latex, the graft copolymerization likewise preferably being carried out in emulsion. In order to produce ASA polymers having good mechanical properties, it has proven necessary for the polyacrylate rubber serving as the graft base to be crosslinked, ie. for the acrylates to be copolymerized with small amounts of bifunctional, crosslinking monomers during the preparation of the rubber.

A further development of the process disclosed in DE 12 60 135 is described in U.S. Pat. No. 3,691,260 (DE 19 11 882), according to which the graft base in the graft polymerization is a coarse latex of a crosslinked acrylate polymer having a mean particle diameter of from 150 to 800 nm and a narrow particle size distribution. Compared with products prepared using fine acrylate polymer latices, the ASA polymers prepared using coarse acrylate polymer latices have improved notched impact strength, greater hardness and reduced shrinkage, but are more difficult to color, giving only dull, pastel shades, but not the brilliant, bright colors desired.

A further development of the process disclosed in DE 19 11 882 is described in U.S. Pat. No. 4,634,734 (DE 31 49 358), in which the graft base used is a crosslinked alkyl acrylate rubber having a mean particle size of 200 to 500 nm. The grafting is carried out in two steps; in a first step, only vinyl-aromatic monomers are grafted on, and in a second step, a mixture of a vinyl-aromatic monomer and an ethylenically unsaturated monomer are grafted. The principal advantage of this process is that the molding materials prepared using these graft copolymers can readily be colored, in spite of the relatively large mean particle size of the graft copolymer.

U.S. Pat. No. 4,224,419 (DE 28 26 925) describes ASA polymers having high impact strength which are easy to color. These properties are achieved by blending two graft rubbers of different particle sizes.

In spite of said improvements, the surface gloss of the moldings produced using coarse graft copolymers is still a problem, in particular under unfavorable processing conditions. In addition, the preparation of coarse graft bases is more complex and expensive than that of fine graft bases. The blending of two graft rubbers requires complex logistics and additional process steps. In general, a further increase in toughness is of interest for many applications.

It is therefore an object of the present invention to provide products based on ASA polymers which combine the favorable properties of conventional molding materials, such as weathering and aging resistance, rigidity and strength, with significantly improved impact strength and which are easy to prepare.

We have found that this object is achieved by incorporating alkyl acrylates having from 7 to 20 carbon atoms in the alkyl radical into the graft shell of the graft copolymers. The incorporation of alkyl acrylates into the graft shell of diene rubbers has already been described in U.S. Pat. No. 4,308,355 and U.S. Pat. No. 4,351,923. However, it could not have been expected that the incorporation of alkyl acrylates into the graft shell of alkyl acrylate rubbers which have an entirely different structure and composition to diene rubbers would improve the impact strength, especially as it is known from EP 270 948 that, although the incorporation of relatively short-chain alkyl acrylates (having up to 6 carbon atoms in the alkyl radical) into the graft shell of graft copolymers eases the processing of graft copolymers with respect to filterability, dewatering and drying and gives powders having improved properties, such as flow, grain size distribution, bulk density and shelf life, it only slightly improves the toughness compared with graft copolymers prepared without alkyl acrylates.

The invention accordingly provides a thermoplastic molding material which contains (based on the sum of A+B+C):

A: from 1 to 30% by weight of one or more elastomeric polymers A having a mean particle size of from 30 to 1000 nm and comprising, based on A,
  A1: from 50 to 99.9% by weight of one or more alkyl acrylates A1 having from 1 to 8 carbon atoms in the alkyl radical,
  A2: from 0.1 to 5% by weight of one or more polyfunctional, crosslinking monomers A2 and
  A3: up to 50% by weight of one or more monoethylenically unsaturated monomers A3, as the graft base,
B: from 5 to 40% by weight of a shell B grafted onto the elastomeric polymer A and comprising, based on B,
  B1: from 30 to 90% by weight of one or more vinyl-aromatic monomers B1,
  B2: from 5 to 40% by weight of one or more polar, copolymerizable, ethylenically unsaturated monomers B2, and
  B3: from 5 to 30% by weight of one or more alkyl acrylates B3 having from 7 to 20 carbon atoms in the alkyl radical, and
C: from 30 to 94% by weight of a copolymer C comprising
  C1: one or more vinyl-aromatic monomers C1 and
  C2: one or more polar, copolymerizable, ethylenically unsaturated monomers C2.

The following details apply to the composition of the molding material and the constituents and preparation thereof.

Graft base A

The elastomeric polymers comprising a graft base (rubber) A and a graft shell B are obtained in a conventional manner. The rubber A is a crosslinked acrylate polymer having a glass transition temperature of below 0° C., preferably below −20° C., particularly preferably below −30° C. (the glass transition temperature is determined, for example, by the DSC method; K. H. Illers, Makromol. Chemie 127 (1969) p. 1). Suitable monomers A1 for the preparation of the rubbers are alkyl acrylates having from 1 to 8 carbon atoms, in at least some cases those having from 4 to 8 carbon atoms, in the alkyl radical. n-Butyl acrylate and ethylhexyl acrylate are particularly suitable. The acrylates can in each case be employed alone or mixed with one another.

In order to achieve good mechanical properties, it has proven necessary for the acrylate polymer used as the graft base to be crosslinked. To this end, the polymerization of the acrylates is carried out in the presence of from 0.1 to 5% by weight, preferably from 1 to 4% by weight, based on the total weight of the monomers employed in the preparation of the graft base, of a copolymerizable, polyfunctional monomer A2 which effects the crosslinking. Suitable monomers are those which contain two or more ethylenic double bonds which are capable of copolymerization and are not conjugated in the 1,3-position. Examples are divinylbenzene, diallyl maleate, diallyl fumarate, diallyl phthalate, allyl methacrylate, triallyl cyanurate and triallyl isocyanurate. A particularly favorable crosslinking monomer is the acrylate of tricyclodecenyl alcohol (cf. DE 12 60 135).

If necessary, the polymer A may also contain up to 50% by weight, generally up to 30% by weight, of a further copolymerizable monomer A3, such as butadiene, isoprene, styrene, acrylonitrile, methyl methacrylate and/or vinyl methyl ether.

The graft copolymer can be prepared by the method described in DE 12 60 135. To this end, the graft base A is first prepared by polymerizing the acrylate or acrylates A1 and the polyfunctional monomer A2, if desired together with the further comonomer A3, in aqueous emulsion at from 20 to 100° C., preferably from 50 to 80° C. The conventional emulsifiers, such as the alkali metal salts of alkyl- or alkylarylsulfonic acids, alkyl sulfates, fatty alcohol sulfonates, salts of higher fatty acids having from 10 to 30 carbon atoms, or resin soaps, can be used. Preference is given to the sodium salts of alkylsulfonates or of fatty acids having from 10 to 18 carbon atoms It is favorable to employ the emulsifiers in amounts of from 0.5 to 5% by weight, in particular from 1 to 2% by weight, based on the total weight of the monomers used. In general, a water/monomer ratio of from 2:1 to 0.7:1 is used. The polymerization initiators are, in particular, the conventional persulfates, eg. potassium peroxodisulfate; however, redox systems are also suitable. The amount of initiator (eg. from 0.1 to 1% by weight, based on the total weight of the monomers) depends, as is known, on the desired molecular weight.

Polymerization auxiliaries which can be used are conventional buffer substances, through which the pH is set at, preferably, 6 to 9, eg. sodium bicarbonate and sodium pyrophosphate, and up to 3% by weight of molecular weight regulator, such as a mercaptan, a terpinol or dimeric a-methylstyrene.

The precise polymerization conditions, in particular the type, metering rate and amount of the emulsifier, are determined individually within the abovementioned ranges in such a manner that the resultant latex of the crosslinked acrylate polymer has a $d_{50}$ value in the range from about 30 to 1000 nm, preferably in the range from 50 to 800 nm.

In principle, it is also possible to prepare the graft base by another method than emulsion polymerization, eg. by bulk or solution polymerization, and subsequently to emulsify the resultant polymer. The processes for this are known.

Graft shell B:

To prepare the graft copolymer comprising core and graft shell, a monomer mixture of one or more vinyl-aromatic monomers B1 and one or more copolymerizable, polar monomers B2 is polymerized in the ratio from 90:10 to 60:40, preferably from 80:20 to 65:35, in the presence of the latex A. Examples of vinyl-aromatic polymers are styrene, a-methylstyrene and ring-alkylated styrenes, such as p-methylstyrene and tert-butylstyrene. Particular preference is given to styrene, a-methylstyrene and p-methylstyrene. Examples of polar, copolymerizable, ethylenically unsaturated monomers B2) are acrylonitrile, alkyl methacrylates having from 1 to 4 carbon atoms in the alkyl radical, acrylic acid, maleic anhydride, acrylamide and/or vinyl methyl ether. Preference is given to acrylonitrile, methyl methacrylate and mixtures thereof. The acrylates B3 contain from 8 to 12 carbon atoms in the alkyl radical, for example ethylhexyl acrylate and decyl acrylate. Particularly preferred monomer mixtures contain from 45 to 80% by weight of styrene or a-methylstyrene, from 10 to 30% by weight of acrylonitrile and from 10 to 25% by weight of ethylhexyl acrylate.

It is advantageous to also carry out the graft copolymerization onto the polymer serving as the graft base in aqueous emulsion, expediently using the same system as for the polymerization of the graft base; further emulsifier and initiator can be added. The monomer mixture to be grafted on can be added to the reaction mixture in one portion, in batches over several steps or preferably continuously during the polymerization. The graft copolymerization is carried out in such a manner that a degree of grafting of 10 to 45% by weight, preferably from 15 to 40% by weight, results.

Hard component C

In addition to the graft copolymer comprising A and B, the mixtures according to the invention contain a hard component C comprising one or more copolymers of a vinyl-aromatic monomer C1 and of a polar, copolymerizable, ethylenically unsaturated monomer C2, which makes up a proportion of from 30 to 94% by weight, based on A+B+C. Preferred vinyl-aromatic monomers C1 are styrene and α-methylstyrene, and the preferred ethylenically unsaturated monomer C2 is acrylonitrile. The proportion of the ethylenically unsaturated monomer C2 should be from 20 to 40% by weight, based on the hard component C.

This hard component C, generally prepared separately, can be, for example, a styrene/acrylonitrile copolymer, an α-methylstyrene/acrylonitrile copolymer, a styrene/maleic anhydride copolymer, an α-methylstyrene/styrene/acrylonitrile terpolymer, a styrene/acrylonitrile/methyl methacrylate terpolymer, a styrene/acrylonitrile/maleic anhydride terpolymer, a styrene/acrylonitrile/acrylic acid terpolymer or an α-methylstyrene/styrene/acrylonitrile terpolymer.

Copolymers which are particularly preferred for the preparation of the hard component C contain from 60 to 80% by weight of styrene and/or α-methylstyrene and from 20 to 40% by weight of acrylonitrile. These copolymers can be employed individually or in mixtures with one another for the hard component. The hard component C can be obtained by conventional methods, for example by copolymerization of styrene and/or α-methylstyrene with acrylonitrile in bulk, solution, suspension or aqueous emulsion. The hard component C preferably has a viscosity number of from 40 to 100, particularly preferably from 50 to 80.

The blending of the hard component C with the graft copolymer A+B to form the materials according to the invention can be carried out by first blending some of the hard component C with the graft copolymer A+B and then adding the remainder of the hard component C. However, the blending can also be carried out in one step.

The molding material is preferably prepared by vigorosly mixing a melt of the hard polymer C with the graft copolymer A+B at above 200° C.

A preferred molding material has an elastomeric phase comprising butyl acrylate and tricyclodecenyl acrylate which is grafted with a monomer mixture comprising 60% by weight of styrene, 20% by weight of acrylonitrile and 20% by weight of ethylhexyl acrylate and blended with a styrene/acrylonitrile hard component containing 35% by weight of acrylonitrile.

The blending can be carried out in any conventional manner. If the components have been prepared by emulsion polymerization, it is possible, for example, to mix the polymer dispersions obtained with one another, then jointly to precipitate the polymers and jointly to work up the polymer mixture. However, blending by joint extrusion, compounding or rolling of the components is preferred, the components having previously been isolated, if appropriate, from the solution or aqueous dispersion obtained in the polymerization. In an alternative procedure, only some of the water is removed from the graft copolymerization products A+B obtained in aqueous dispersion, and the latter are then mixed, as moist crumbs, with the hard component C, the graft copolymers being dried completely during the mixing.

The thermoplastic molding materials according to the invention can contain, as further components, additives which are conventional and customary in ASA polymers. Specific examples are fillers, further, compatible plastics, antistatics, antioxidants, flameproofing agents, lubricants, dyes and pigments. The additives are employed in conventional amounts, preferably in amounts of 0.1 to 30% by weight, based on the total weight of the thermoplastic molding material. Compatible plastics may also be employed in higher amounts.

The materials according to the invention can be processed by methods which are conventional for thermoplastics, eg. extrusion or injection molding, to give moldings, eg. window profiles, garden furniture, boats, signs, lamp covers, automotive parts, and children's toys. The materials according to the invention are particularly suitable for the production of moldings where high impact strength and good weathering and aging resistance are required.

The data used below for characterization purposes were determined as follows:

1. The mean particle size is in all cases the weight average particle size, as determined using an analytical ultracentrifuge by the method of W. Scholtan and H. Lange, Kolloid-Z. and Z.-Polymere 250 (1972), pages 782 to 796. The ultracentrifuge measurement gives the integral weight distribution of the particle diameter of a sample. This can be used to determine the percentage by weight of the particles having a diameter less than or equal to a certain size. The mean particle diameter, also known as the $d_{50}$ value of the integral weight distribution, is defined as the diameter which 50% by weight of the particles are above and 50% by weight of the particles are below.

2. The notched impact strength [kJ/m$^2$] was measured by the method of DIN 53 453 on small standard specimens injection molded at 220° C. or 250° C. The results obtained for the examples are shown in Table 1.

3. The viscosity numbers [cm$^3$/g] were determined on a 0.5% strength solution in methyl ethyl ketone. The insoluble and gel components were removed before the measurement by centrifugation and the sample weight was corrected correspondingly.

The amount data used in the examples relate to the weight, unless otherwise specified.

EXAMPLES

1. Preparation of a base rubber (component A)

16 kg of butyl acrylate and 0.4 kg of tricyclodecenyl acrylate were warmed to 60° C. with stirring in 150 kg of water with addition of 0.5 kg of the sodium salt of a $C_{12}$- to $C_{18}$-paraffinsulfonic acid, 0.3 kg of potassium peroxodisulfate, 0.3 kg of sodium hydrogen carbonate and 0.15 kg of sodium pyrophosphate. 10 minutes after the polymerization reaction had commenced, a mixture of 82 kg of butyl acrylate and 1.6 kg of tricyclodecenyl acrylate was added over the course of 3 hours. When the addition of the monomers was complete, the emulsion was kept at 60° C. for a further hour. The resultant emulsion of the crosslinked butyl acrylate polymer had a solids content of 40% and a mean particle size of 76 nm.

2. Preparation of the graft rubbers 4200 g of the emulsion obtained in (1) were mixed with 2300 g of water and 5.4 g of potassium peroxodisulfate, and the mixture was warmed to 65° C. with stirring. The monomer mixture indicated in Table 1 was then added over the course of 3 hours. When the addition was complete, the emulsion was kept at 65° C. for a further 2 hours. The graft polymer was precipitated from the emulsion using calcium chloride solution at 95° C., washed with water and dried in a stream of warm air.

3. Preparation of the blends

The blends were prepared using a hard component of styrene/acrylonitrile copolymer containing 35% of acrylonitrile and having a viscosity number of 80 ml/g. The precipitated and dried graft copolymer from (2) was blended with the same amount of the hard component C in an extruder at 260° C. Small standard specimens were produced therefrom by injection molding.

As the results show, a considerable increase in the notched impact strengths is observed compared with the standard experiment without alkyl acrylates in the graft shell. The increase in the notched impact strengths is particularly pronounced at low injection temperatures. By contrast, short-chain alkyl acrylates such as butyl acrylate only result in a small improvement, or even in impairment of the notched impact strengths, as shown by the comparative experiment.

TABLE

| | Component B[1] | | | | Injection temperature[2] | Notched impact strength [kJ/m$^2$] |
|---|---|---|---|---|---|---|
| | S | AN | EHA | BA | | |
| 1 | 60 | 25 | 15 | — | 220° C. | 8.9 |
| | | | | | 250° C. | 11.9 |
| 2 | 65 | 20 | 15 | — | 220° C. | 9.9 |
| | | | | | 250° C. | 10.1 |
| 3 | 60 | 20 | 20 | — | 220° C. | 18.0 |
| | | | | | 250° C. | 12.7 |
| 4 | 55 | 20 | 25 | — | 220° C. | 13.6 |
| | | | | | 250° C. | 11.7 |
| Comparison | 60 | 25 | — | 15 | 220° C. | 6.6 |
| | | | | | 250° C. | 5.1 |
| Standard | 75 | 25 | — | — | 220° C. | 6.2 |

TABLE-continued

| Component B[1] | | | | Injection temperature[2] | Notched impact strength [kJ/m²] |
|---|---|---|---|---|---|
| S | AN | EHA | BA | | |
| | | | | 250° C. | 8.5 |

[1] Composition of the monomer mixture, in percent by weight, used to prepare component B
[2] Bulk temperature of the thermoplastic molding material during injection molding
S = styrene
AN = acrylonitrile
EHA = ethylhexyl acrylate
BA = butyl acrylate

We claim:

1. A thermoplastic molding material containing (based on the sum of A+B+C)

A: from 1 to 30% by weight of one or more elastomeric polymers A having a mean particle size of from 30 to 1000 nm and comprising, based on A,
   A1: from 50 to 99.9% by weight of one or more alkyl acrylates A1 selected from the group consisting of butyl acrylate and ethylhexyl acrylate,
   A2: from 0.1 to 5% by weight of one or more polyfunctional, crosslinking monomers A2 which contain two or more ethylenic double bonds which are capable of copolymerization and are not conjugated in the 1,3-position and
   A3: up to 50% by weight of one or more monoethylenically unsaturated monomers A3, selected from the group consisting of butadiene, isoprene, styrene, acrylonitrile, methyl methacrylate and vinyl methyl ether as the graft base, B: from 5 to 40% by weight of a shell B grafted onto the elastomeric polymer A and comprising, based on B,
   B1: from 30 to 90% by weight of styrene monomer B1,
   B2: from 5 to 40% by weight of acrylonitrile monomer B2; and
   B3: from 5 to 30% by weight of ethylhexyl acrylate monomer B3, and C: from 30 to 94% by weight of copolymer C consisting of
   C1: styrene C1 and
   C2: acrylonitrile C2.

2. A thermoplastic molding material as claimed in claim 5, whose graft shell B comprises from 45 to 80% by weight of monomer B1, from 10 to 30% by weight of monomer B2 and from 10 to 25% by weight of monomer B3.

* * * * *

UNITED STATES PATENT AND TRADEMARK OFFICE
CERTIFICATE OF CORRECTION

PATENT NO. : 5,120,788

DATED : June 9, 1992

INVENTOR(S) : Friedrich Seitz et al.

It is certified that error appears in the above-identified patent and that said Letters Patent is hereby corrected as shown below:

On the title page, item [54] and in col. 1, lines 2 and 3 should be

--THERMOPLASTIC MOLDING MATERIAL OF IMPROVED TOUGHNESS--.

Signed and Sealed this

Third Day of August, 1993

Attest:

MICHAEL K. KIRK

Attesting Officer     Acting Commissioner of Patents and Trademarks